Jan. 10, 1939.　　　　　L. R. POE　　　　　2,143,523
ANTISKID DEVICE
Filed Sept. 25, 1937
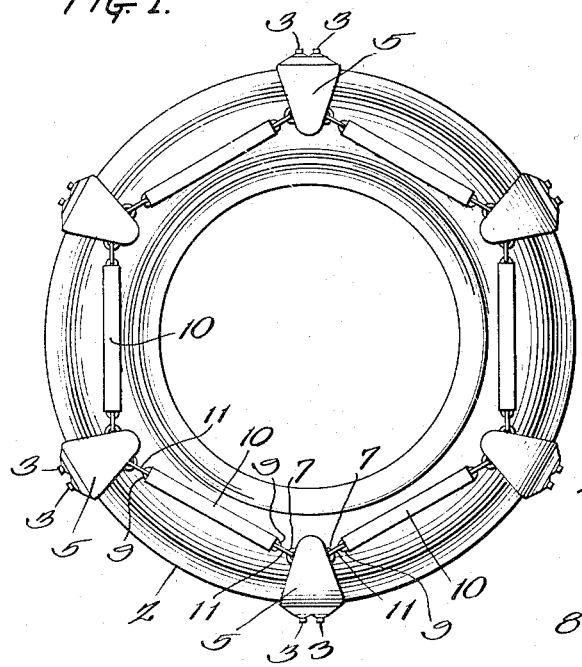
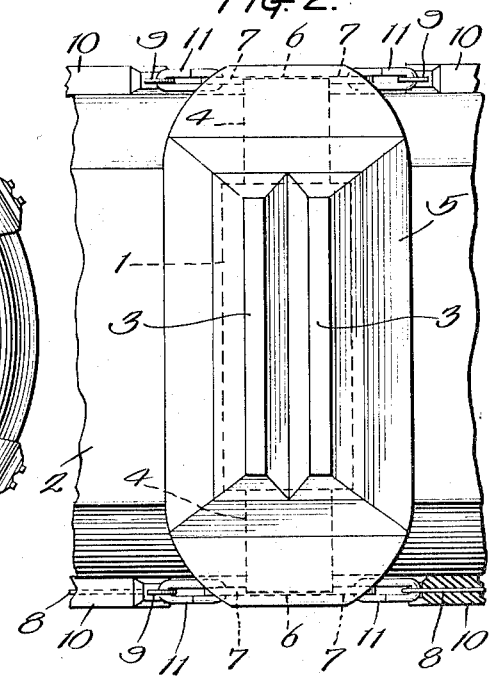
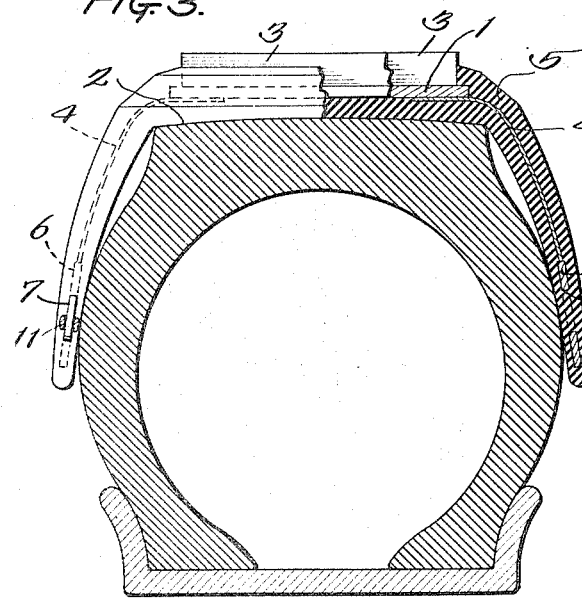
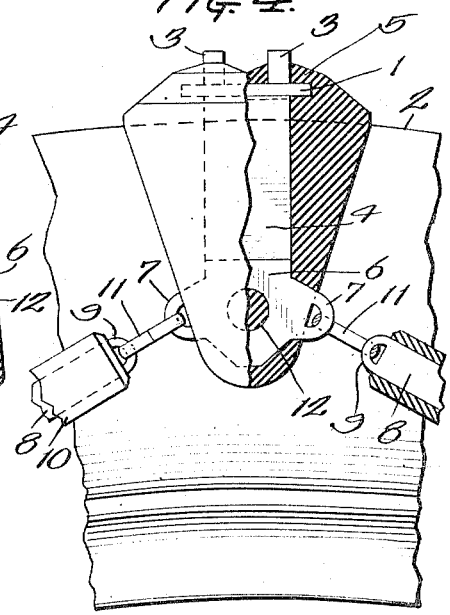
INVENTOR:
LLOYD R. POE
BY (signature)
ATTY.

Patented Jan. 10, 1939

2,143,523

UNITED STATES PATENT OFFICE 2,143,523

ANTISKID DEVICE

Lloyd R. Poe, Bloomington, Ill., assignor of one-third to Jacob J. Fisher and one-third to Eugene Bennington, both of Bloomington, Ill.

Application September 25, 1937, Serial No. 165,688

2 Claims. (Cl. 152—222)

This invention relates to improvements in pneumatic tired vehicles, and more particularly to an improved anti-skid device therefor.

It is an object of this invention to provide an improved anti-skid device of the same general type as the so-called wheel chains now on the market which usually consist of a plurality of short lengths of chain arranged transversely about the tread of the tire, and which are held in spaced apart relation about the tire by connecting lengths of chain on each side of the tire.

The purpose of the wheel chains is to prevent loss of traction when the vehicle is traveling through snow, mud or sand, or upon ice or damp slippery pavements, and also to lessen, if not prevent, the tendency of the vehicle traveling under such conditions to skid or slide side ways.

It has been found in practice that wheel chains of this type not only wear the tread of the tire, but the tread chains quickly wear and break when used but a short time upon a hard surface.

It is an object of this invention to overcome many of the disadvantages of the present day wheel or anti-skid chain by providing a plurality of anti-skid units to be substituted for the usual anti-skid chains so constructed as to be readily applied to the tire and in which the metallic portions will be rigid, except the portions actually in contact with the road bed protected from wear and corrosion, which will not be injurious to the tire upon which they are used and in which the parts contacting the road bed are separate from and cushioned in their contact with the tread of the tire.

With these and other objects in view, reference is made to the accompanying sheet of drawings in which a preferred form of this invention is illustrated with the understanding that minor changes may be made without departing from the scope thereof.

In the drawing:

Figure 1 is a view in side elevation of an automobile tire upon which this improved anti-skid device has been applied.

Figure 2 is an enlarged fragmentary plan view of a portion of a tire upon which this improved anti-skid device has been applied.

Figure 3 is an enlarged, detail view showing an automobile tire in transverse section upon which this improved anti-skid device has been applied, shown with parts broken away and partly in section, to illustrate the detail construction of this improved anti-skid device.

Figure 4 is a view in side elevation of Figure 3 with parts broken away and partly in section.

To accomplish the objects of this invention, it is contemplated to embed and vulcanize a plate or base 1 of metal in rubber and support the plate transversely of and cushioned upon the tread 2 of the tire to form each unit of a plurality of anti-skid devices as are usually secured about the tire of an automobile. The outer surface of the plate or base 1 is preferably provided with two or more spaced apart ribs 3, preferably formed integral therewith, extending above the base and transversely of the tread of the tire to bear upon the surface of the road. The plate or base 1 of metal is also preferably provided at each side with straps 4 of thinner flexible metal extending in continuation thereof which may be spot welded thereto. These straps 4 as well as the base 1 are embedded in a vulcanized rubber covering 5 extending on each side of the base 1 and straps 4, as shown in detail in Figure 4, and which may be formed to embed portions of the ribs 3, if so desired. Each free end or extremity of the straps 4 are preferably provided with a connecting plate 6 of thicker metal having connecting eyes 7 extending on opposite sides therefrom beyond the vulcanized rubber cover 5, as shown in Figure 4, and may be centrally perforated if desired.

Each anti-skid device is a separate unit and the desired units are held in equally spaced apart positions over the tread of the tire by connecting the eyes 7 on each side of the tire by metal straps 8 which are also preferably embedded in vulcanized rubber with the ends of each provided with a connecting eye 9 extending beyond the vulcanized rubber covering 10 adapted to be connected to the eyes 7 by metal links 11, or any other desired connecting means.

The plate or base 1 and ribs 3 are preferably formed integral and of drop forged case-hardened steel and of such dimensions to extend transversely of the tread 2. The straps 4 are preferably of web steel spot welded to the base 1, and the connecting plates 6 are preferably formed steel, spot welded to the straps. The straps 8 are also preferably of web steel. The straps 4 being of thin web steel are flexible, and therefore, may be drawn tightly against the sides of the tire shoe 2 to hold the base 1 in contact with the tread of the tire. The vulcanized rubber covering 5 of each anti-skid unit, as well as the vulcanized covering 10 of the connecting straps 8, in both instances covers and protects the metal it surrounds. In the case of the anti-skid unit, the vulcanized rubber covering has an additional function and that is to cushion the transverse ribs 3 upon the tire tread. It is also preferable to re-inforce this vulcanized rubber covering and cushion 5, if desired, with webbing or cords in the same manner that the present day tires are re-inforced to increase its resistance to wear and still maintain its cushion effect. The perforation 12 in each connecting plate is engaged by the body of the cover 5 and assists in holding the cover thereon, and in maintaining its relation with the part of the cover acting as a cushion between the tread 2 of the tire and under side of the base 1.

What I claim is:

1. A traction unit for pneumatic tires including a solid rectangular metallic base having one or more longitudinal solid metallic ribs integral with said base, straps of spring metal secured to each transverse end of the base, a cushion of resilient material embedding the base and straps but exposing the solid metal ribs, and means for securing the unit transversely upon the tread of a tire.

2. A traction and anti-skid unit for pneumatic tires having a substantially flat tread including a solid rectangular metallic base coextensive with the transverse flat surface of the tire tread having an outstanding integral rib projecting from the base throughout its greatest dimension, strips of spring metal welded upon the under side of each end of the base adapted to embrace the side walls of the tire, a rubber cushion between the metallic base and straps and body of the tire surrounding the outer surfaces of the base and straps but exposing the said projecting rib, and means projecting through the rubber covering of each end of each strap for engagement with means to secure the unit transversely upon the tread of the tire.

LLOYD R. POE.